United States Patent [19]
Acimovic et al.

[11] Patent Number: 5,517,185
[45] Date of Patent: May 14, 1996

[54] BUILDING COMMUNICATION AND CONTROL SYSTEM

[75] Inventors: Dragica Acimovic, Burnaby; Keith J. Campden, West Vancouver; George A. Drohomirecki; Calum A. Hester, both of Vancouver; Dennis K. Ho, Burnaby; Fernando J. Jubany, Surrey; Jim C. Siu, Richmond, all of Canada

[73] Assignee: Viscount Communication and Control Systems, Vancouver, Canada

[21] Appl. No.: 265,272

[22] Filed: Jul. 1, 1994

[51] Int. Cl.[6] .................................................. H04M 11/00
[52] U.S. Cl. ................................... 340/825.31; 370/85.9; 379/103
[58] Field of Search ................................ 370/85.1, 85.9, 370/85.11, 85.12; 340/825.31, 825.06; 379/95, 103, 104, 105

[56] References Cited

U.S. PATENT DOCUMENTS

| | | | |
|---|---|---|---|
| 3,404,393 | 10/1968 | Blivice et al. | 379/103 |
| 4,535,448 | 8/1985 | Baxter et al. | 370/85.11 |
| 4,937,855 | 6/1990 | McNab et al. | 379/103 |

OTHER PUBLICATIONS

Introducing the LON, Echelon Corporation, 1990.
Introducing LON Technology Motorola Semiconductor Technical Data Product Review, Motorola Inc., 1991.

*Primary Examiner*—Wellington Chin
*Attorney, Agent, or Firm*—Shlesinger Arkwright Garvey

[57] ABSTRACT

An integrated building control system which includes a digital, time-multiplexed, multi-channel voice/data bus for conducting voice and data, a local operating network bus for conducting communication and control processor protocol signals, a CO-RES bus having sets of tip and ring lines for conducting analog voice and data signals, a line card unit having a line card communication and control processor, the line card unit coupled to the CO-RES bus, to a set of central office lines and to a corresponding set of resident telephone lines, and operative to activate switches so as to couple selected ones of the CO and resident telephone lines to the CO-RES bus, a line interface unit having a line interface communication and control processor, the line interface unit coupled to the CO-RES Bus and to the voice/data bus, and operative to provide digital signal processing capabilities, a digital interface unit having a digital interface communication and control processor, the digital interface unit coupled to the voice/data bus and operative to receive, route and transmit digital voice and data signals to and from the voice/data bus. An entrance panel unit having an entrance panel communication and control processor, has means for receiving information, means for displaying output information, and means for controlling building access. Each of the communication and control processors are coupled to a common local operating network bus and engage in distributed, peer-to-peer communications and control and monitor the operation of components of their respective units.

17 Claims, 10 Drawing Sheets

BUILDING COMMUNICATION AND CONTROL SYSTEM

FIELD

The present invention relates to an integrated building services system for providing and integrating telecommunications systems, security systems, alarm systems, safety systems, and access control.

BACKGROUND

Services which are currently provided by a variety of technologies and methods for the use of apartment managers, residents and visitors of a building include building access control, intra-building communications, entrance paging, safety monitoring, security monitoring, interactive control and local or remote alarm monitoring.

Current systems for servicing buildings include a building security system such as that disclosed in U.S. Pat. No. 4,937,855 issued to McNab et al. which utilizes a central computer or CPU in a common control card. All subscribers must access the common control card in order to communicate with a visitor. Thus, only one subscriber at a time can interface with the common control card. Moreover, a visitor call causes interruption of normal ongoing telephone service including data transmissions associated with facsimile messages and tele-software delivery services. In the event a building has more than one visitor entrance panel, such systems are capable of completing only one transaction at a time. Another shortcoming of the McNab system is that the application software contained within the equipment memory is not remotely programmable. Yet another feature that is absent is the failure of equipment modules to be self-diagnosing and reporting. In addition, transaction records of visitor/resident access requests and transactions are not recorded. The absence of discrimination between voice and data in McNab results in data transmissions when in progress being interrupted by a visitor call at the entrance panel.

There is no known system which integrates all of the above-mentioned services which are currently provided on a fragmented basis. Nor can any such system overcome all of the above-mentioned shortcomings of current equipment.

SUMMARY OF THE INVENTION

According to the invention there is provided an integrated building control system having a digital, time multiplexed, multi-channel digital Voice/data bus for conducting voice and data, a local operating network bus for conducting communication and control processor protocol signals, and a CO-RES bus having sets of tip and ring lines. The system includes a line card unit having a set of relays with one relay between each subscriber line and a central office, and a line card communication and control processor coupled to the set of relays. The line card processor is coupled to the local operating network bus and is operative to connect the CO-RES bus to a central office line or monitor a resident line. A line interface unit has a line interface communication and control processor with the former being coupled to the CO_RES bus and to the digital voice/data bus. The line interface unit interfaces between lines of the CO-RES bus and the digital voice/data bus and provides digital signal processing of voice and data on the digital voice/data bus under the control of the line interface communication and control processor.

A digital interface unit is coupled to the digital voice/data bus and a DIU communication and control processor which controls the receiving, routing and transmission of digital voice and data signals to and from the digital voice/data bus and to the entrance panel units.

An entrance panel unit is coupled to the digital interface unit and receives from and transmits to the digital interface unit digital voice and data signals. The entrance panel unit has a relay coupled to an entrance door and unlocks the door in response to activation of the relay. A resident data base stores information concerning residents and an output display displays output information. A digital signal processor digitizes and compresses analog voice and data signals. An entrance panel communication and control processor is coupled to and controls the operation of the relay, the display and the digital signal processor. The communication and control processors on the line card unit, the line interface unit, the digital interface unit, and the entrance panel are coupled to and monitor the operation of components on respective ones of the line card unit, the line interface unit, the digital interface unit and the entrance panel unit and engage in distributed, peer-to-peer communications and control.

A high impedance monitor circuit is coupled to the CO-RES bus for discriminating between the presence of voice signals and the presence of data signals on the CO-RES bus. A 2–4 wire interface is coupled to the CO-RES bus and an analog switch is coupled between the 2–4 wire interface and the CODEC for controlling the transmission of analog signals to the CODEC.

The system may include means for detecting and discriminating between voice and data on the tip and ring lines of the CO-RES bus.

Each digital interface unit may communicate concurrently with two entrance panel units.

The local operating network bus, the digital voice data bus, a power distribution line, and the CO-RES bus are located on a backplane common and accessible to all of the units.

The system may provide personal entry code access, card access, coded infra red remote control access and interfaces to other building control equipment.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION OF THE DRAWINGS

Figure 1:
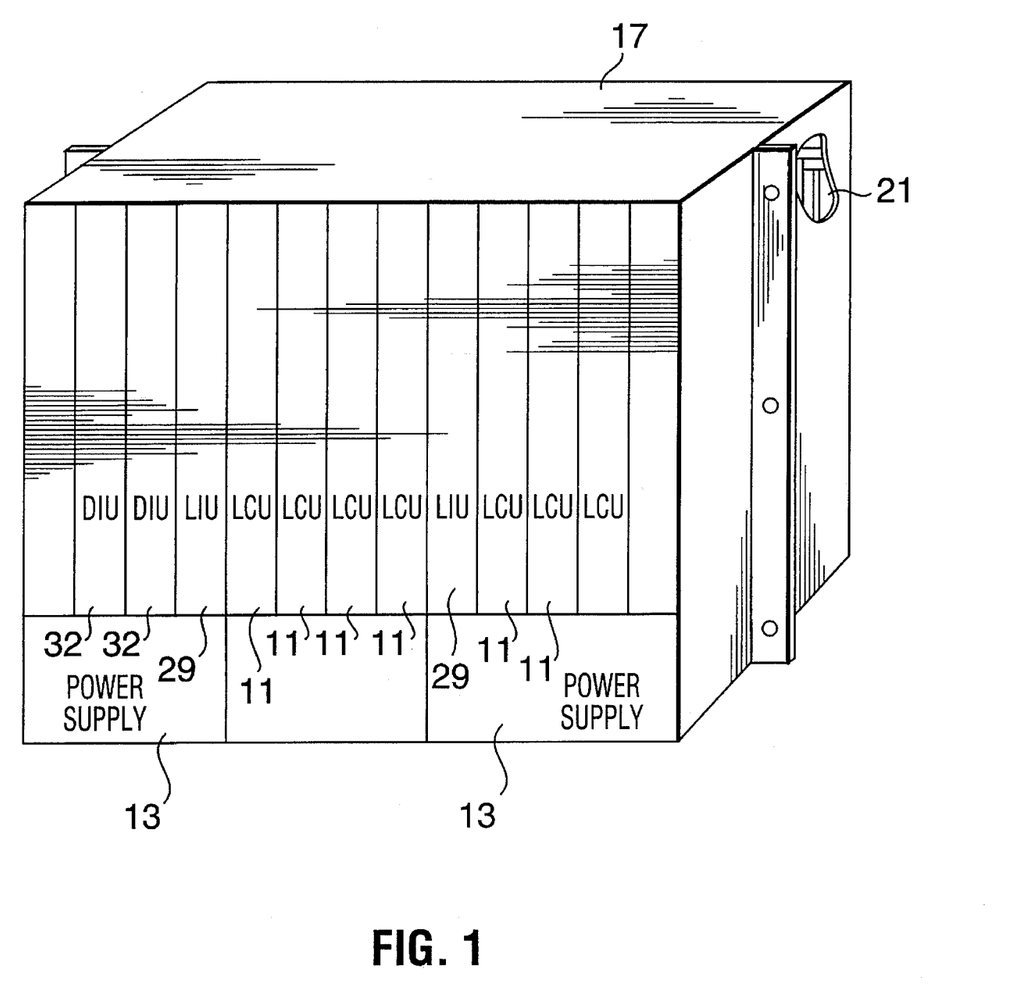
FIG. 1 is a perspective view of a chassis housing the system cards.
Figure 2:
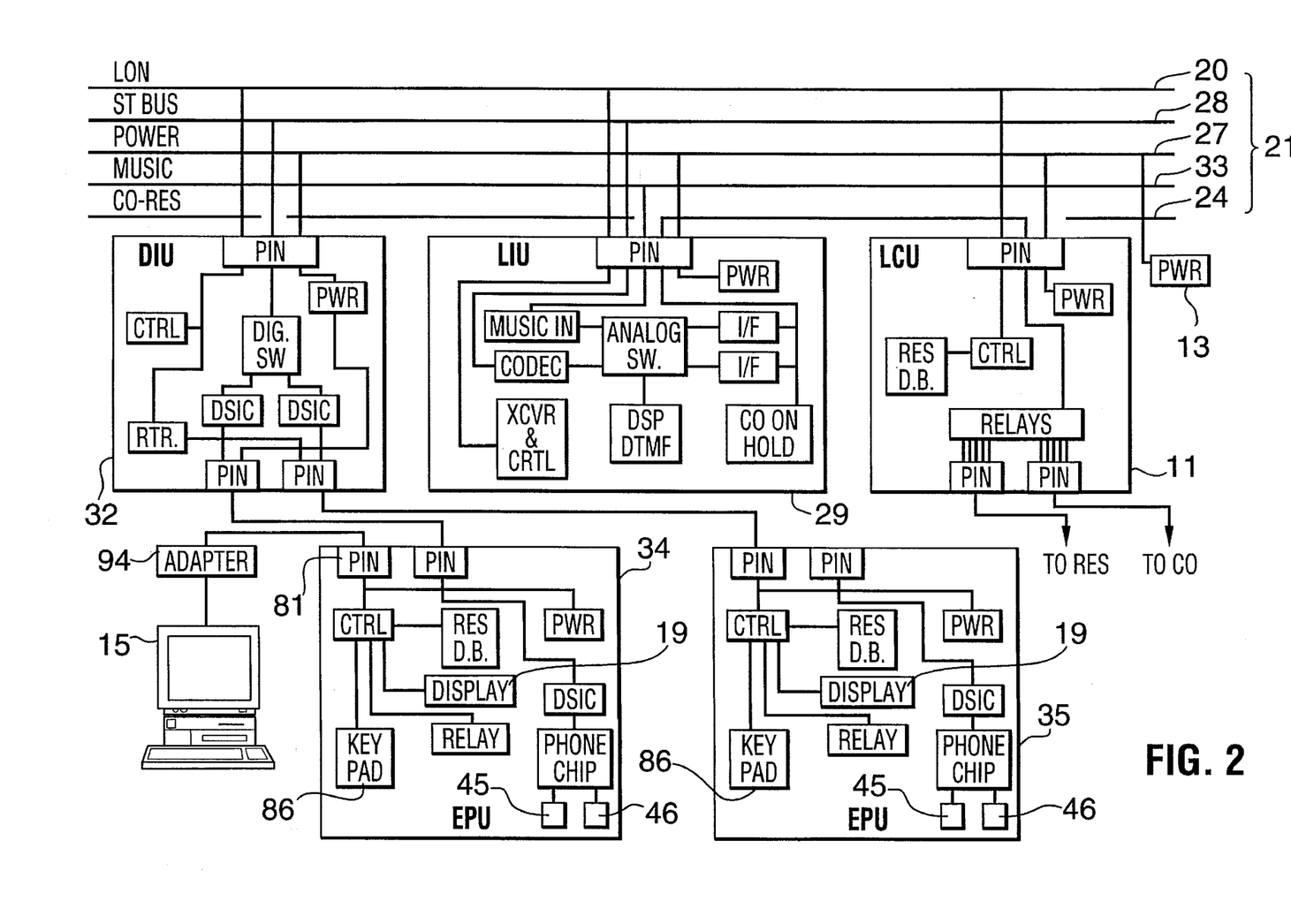
FIG. 2 is a block diagram of the system with one entrance panel.

Referring to FIG. 1 the system includes a cage or chassis 17 into which is slidably, removably inserted a digital interface card 32, a line interface card 29 and one or more line cards 11. Each of the cards receive power from and communicate via a backplane 21. A power supply 13 supplies power to the cards 32, 29 and 11 through the backplane 21. The cards connect to the backplane by pins (not shown) at the back thereof. Referring to FIG. 2 a network management unit 15 couples to the system through the RJ-45 connector 81 of entrance panel unit 34 via a serial LON talk adapter (SLTA) 94 and is used to install, configure and diagnose the system. An entrance panel 34 couples to the digital interface unit 32. The panel 34 has a keypad 86 and a display 19 and a speaker 45 and microphone 46 for voice communication all available for use by a visitor.

Figure 3:
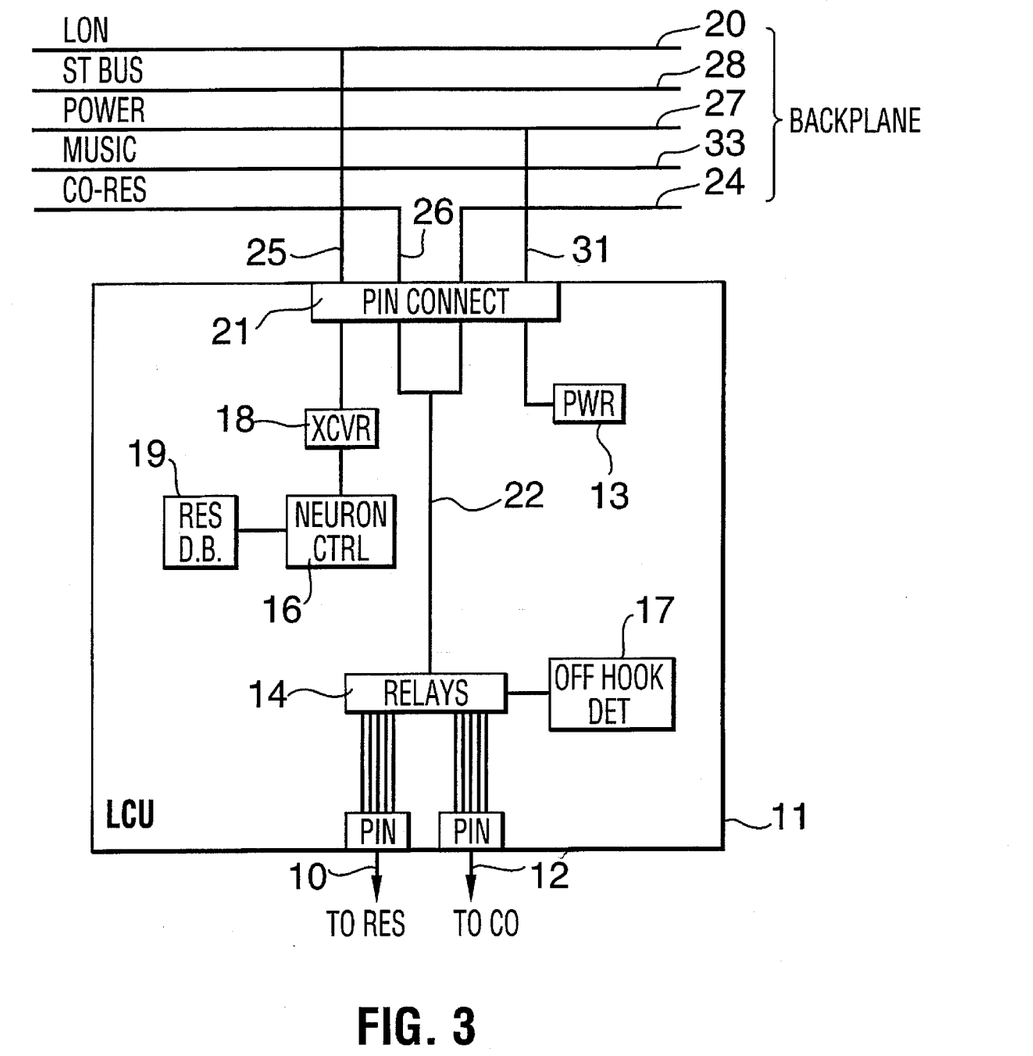
FIG. 3 is a schematic diagram of a portion of the system of FIG. 2 in more detail.
Figure 4:
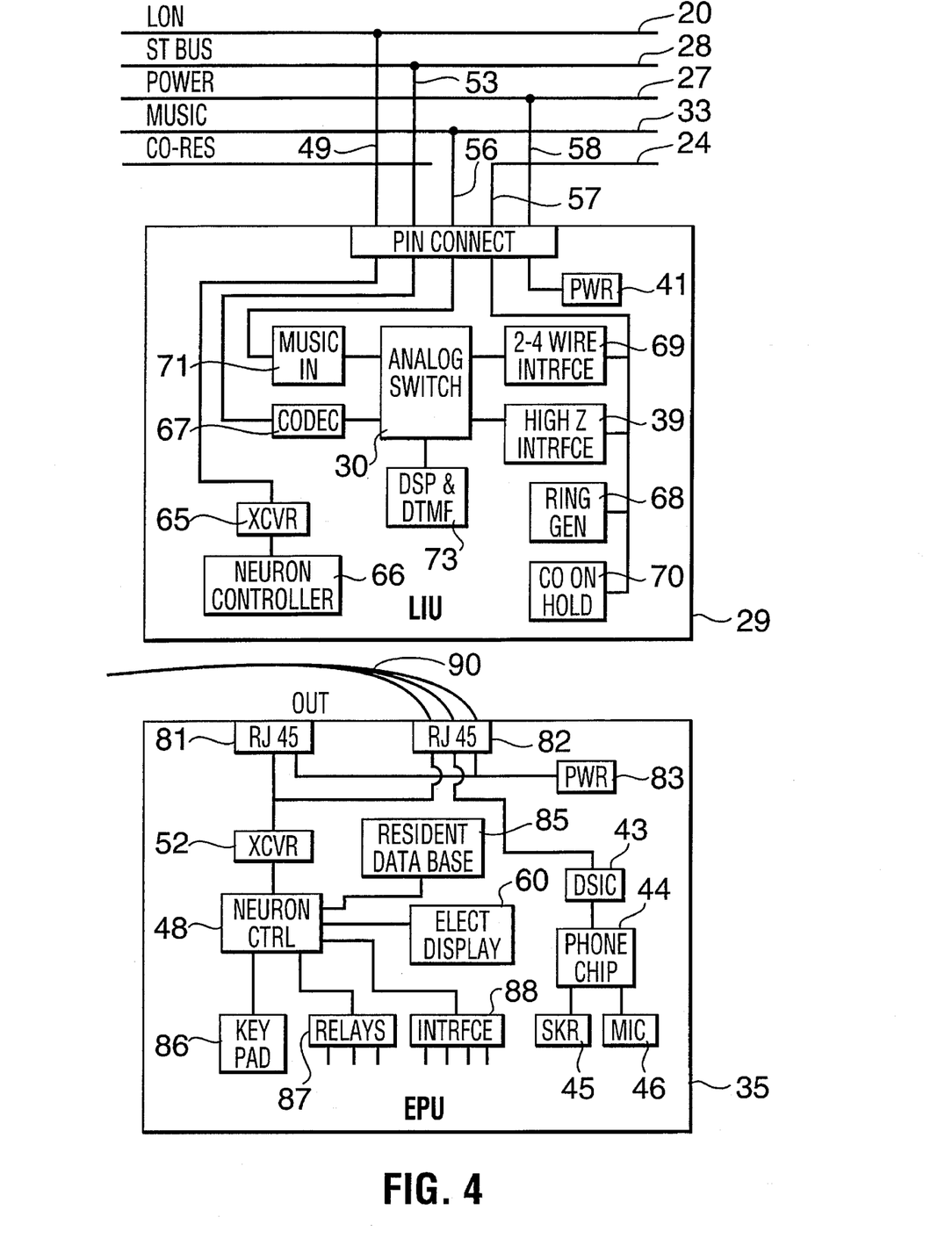
FIG. 4 is a schematic diagram of another portion of the system of FIG. 2.
Figure 5:
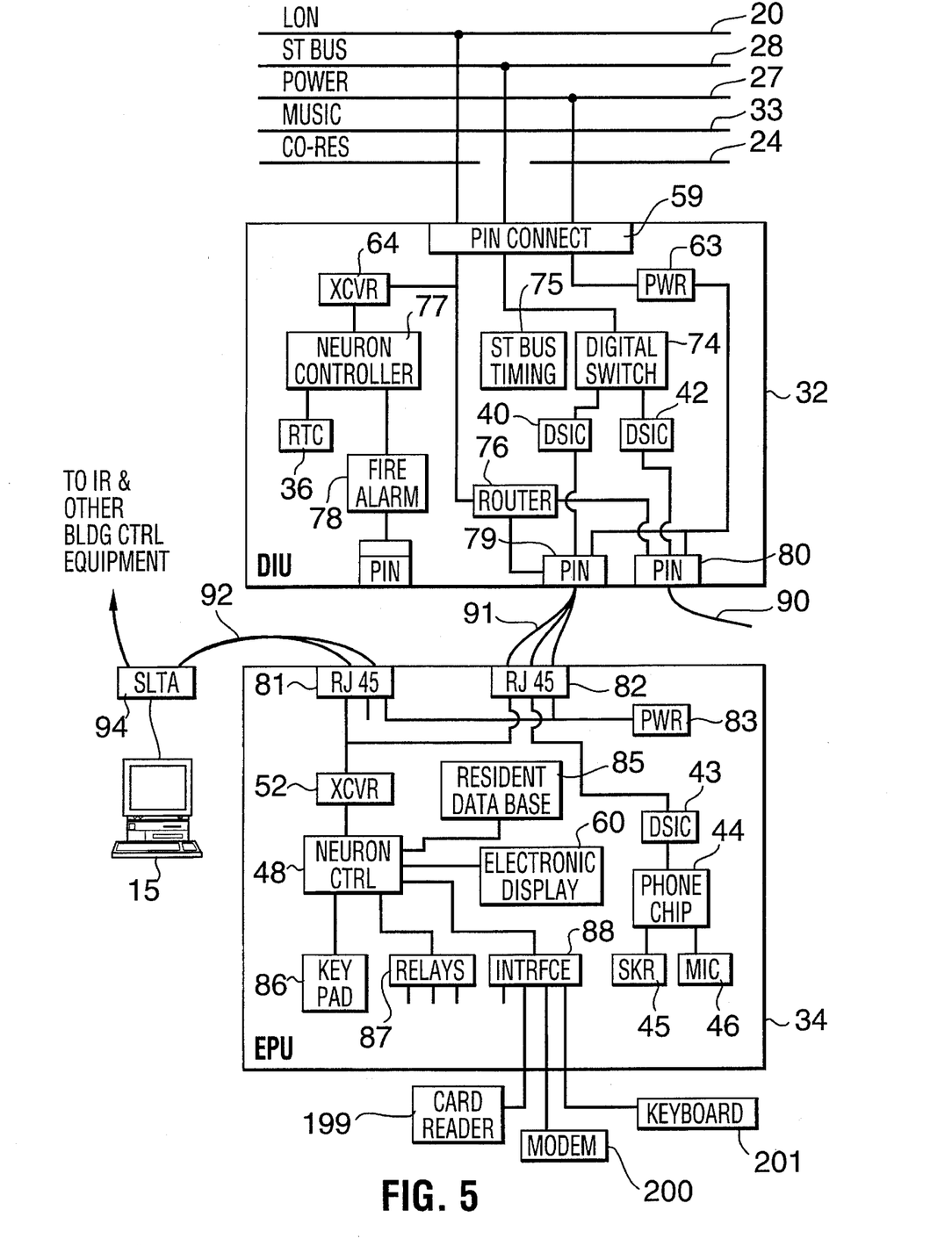
FIG. 5 is a schematic diagram of yet another portion of the system of FIG. 1.

FIGS. 3, 4, and 5 show the system schematic diagram with two entrance panel units 34 and 35 which are usually located outside of the building next to the building entrance door. Like parts in each entrance panel 34 and 35 are referred to with like reference numbers. Cable lines 90 and 91 with RJ-45 connectors connect entrance panels 34 or 35, respectively, to a digital interface unit 32. The latter unit serves to interface between other units in the system and the entrance panel units 34 and 35. A line card unit 11 provides the interface between the analog resident lines 10 and central office lines 12. A line interface unit 29 provides an interface between the analog signals on central office lines 12 and resident lines 10 and digital bus 28.

More specifically, the entrance panel 34 has a visitor keypad 86 which is coupled to a neuron controller 48 and associated transceiver 52 as well as a relay 87 which controls a door, a gate and perhaps a garage door, a speaker 45 and microphone 46 and a telephone chip 44 which is a digital signal processor with a facility for receiving, digitizing and compressing into 8 bit format analog signals. A digital subscriber interface circuit (DSIC) 43 receives compressed digital signals from a DSIC 40 or 42 on digital interface unit 32, are converted by the phone chip 44 to analog signals which go to the speaker 45. A resident database 85 is accessed by the neuron controller 48 to provide address information as to residents. An electronic display 60 provides a visible screen display of information to the visitor. Interface 88 allows coupling to a card reader 98, a modem 200 or an AT keyboard 201.

The RJ45 out connector 81 may be used to connect infra red access control equipment, card reader access control equipment or other building control equipment which uses LON compatible signal protocols. This interface allows for the sharing of system information to provide for extended building services.

The DSIC 40 or 42 on the digital interface unit (DIU) 32 is coupled through a digital switch 74 and pin connector 59 to a Voice/data bus 28. Digital data on the Voice/data bus 28 is routed by digital switch 74 to either DSIC 40 or DSIC 42 in response to control signals from neuron controller 77. A real time clock (RTC) 36 provides date and time for the system. Power generated from a power supply 13 (see FIG. 1) is distributed by power bus 27 and supplied to each unit including the DIU power source 63. The DSIC 40 or 42 transmits the compressed digital data from the switch 74 to the appropriate entrance panel unit 34 or 35. Controller protocol signals from bus 20 or from transceiver 64 are buffered and sorted by router 76 to run either along cable 91 or 90.

Data on the Voice/data bus 28 is formed into 8 streams of 32 channels per stream; each of 64 kilobits per second (Kbps) of information or data. The data is time multiplexed and in serial form. The controller 77 determines which channel is to be passed onto either DSIC 40 or 42.

A separate local operating network bus (LON) 20 on the backplane 21 (see FIG. 2) of the panel or cage 17 transmits data at 625 Kbps among the various neuron chips 16, 66 and 77 on LCU 11, LIU 29 and the DIU 32, respectively.

The LIU 29 provides the interface between the analog central office lines 12 and the resident lines 10 and the Voice/data bus 28. LIU 29 also performs central office terminations and digital signal processing functions. More particularly, CODEC 67 receives analog signals passing through analog switch 30, digitizes them using an 8 KHz sample and hold circuit and compresses the digitized data into 8 bit format before placing it on Voice/data bus 28. The analog signals could come from the voice signal on the CO-RES Tip and Ring Bus 24 originating from a subscriber and CO lines 10 and 12, from the Music In source 71 or a message source advising as to call progress through digital signal processor 73 which has a DTMF transceiver. A ring generator 68 when activated sends a ring signal along CO-RES bus 24 to line 26 and to the appropriate subscriber line 10.

A Line Card Unit (LCU) 11 provides connections to the resident 10 and CO 12 lines and contains off hook detection by Off Hook Detector 17 under the control of communication and control processor controller 16 in order to provide for resident initiated services.

Each communication and control processor 48, 77, 66 and 16 is coupled to each circuit element on its associated one of units 34, 32, 29 and 11, although for simplicity these connections are not shown in the drawings. Each of these processors is coded so that it monitors the operation of each element in its associated unit and detects any fault in any such element. In this way fault monitoring of each element in the system is conducted on a continuous basis without interruption of the operation of the system.

A Network Management Unit 15 with serial LON talk adapter 94 is used to install, configure and diagnose the system. It also performs transaction monitoring and logging and provides for loading of new application software. Unit 15 or another computer either remotely or locally located may also connect through LON serial adapter 94 and be used to change the application codes of the software program so as to change the function of the system as desired.

In operation a visitor, depresses a sequence of buttons on the keypad 86 corresponding to a particular subscriber, say resident #17. The keypad buttons are monitored by the neuron controller 48 which codes the signals, and transmits the address of resident #17 being called on the local operating network 20. The latter information is received by neuron controller 16 which checks the status of the relay connections to resident #17 and reports this result to the local operating network Bus 20.

If the connections are available, the neuron controller 66 on the LIU card 29 then indicates whether or not its circuits are busy. Once the reporting information on the status of the connections to resident #17 and the state of the circuits on the LIU card 29 is received by the neuron controller 77 on the DIU card 32, the latter neuron controller 77 assigns a given channel to the call and reports this channel number, say channel #4, to the local operating network Bus 20 and the latter information is received by the other neuron controllers in the system. The neuron controller 16 on the LCU 11 controls the relay to resident #17 in the relays 14 and reports this to the local operating network Bus 20. The neuron controller 66 on LIU card 29 examines the status of its high impedance monitoring circuits 39 and its digital signal processing circuits 73 to determine whether or not the line to resident #17 is on-hook or off-hook and reports this information on the local operating network Bus 20. (The latter controller 66 also determines whether information on CO-RES line 24 is voice or data using the digital signal processor 73; in the case of data, it informs other cards so that the call is concluded at that point and informs other cards if data is present.) If the phone of resident #17 is on-hook, neuron controller 66 reports whether or not resident #17 has his CO line 12 disconnected. Again assuming it is disconnected, the neuron controller 66 on LIU 29 initiates the ring generator 68 to cause the ringing of resident #17's telephone using distinctive ringing. Once resident #17 has answered his or her telephone, the controller 66 reports this fact to the local operating network Bus 20 and the conversation takes place between the visitor and resident #17.

If the phone of resident #17 is off-hook and with voice, neuron controller 66 initiates intrusion tones to the resident only. Once resident #17 momentarily depresses the hook switch, the CO is placed on hold with music or tone and reports this back to the control network. The conversation then takes place between visitor and resident. Assuming that resident #17 decides to permit entry of the visitor he or she may then press a digit 6 or dial 6 on a rotary dialer on the telephone. The DTMF tone or pulse stream from the resident's telephone is transmitted over relay line 22 and the CO-RES Bus 24 via the Analog switch 30 to the DSP/DTMF 73 which detects the presence of this information and reports this to the local operating network Bus 20 where it is received by neuron controllers 66 and 48. Neuron controller 48 on the EPU 34 opens the relay in relays 87 leading to entrance door (not shown) which causes a solenoid (not shown) to unlock the door and reports both the unlocking and the opening of door through controller 77 to the LON Bus 20. The neuron controller 66 on the LIU 29 monitors the status of the call through the analog switch 30 and reports to the LON Bus 20 when resident #17 has hung up. Neuron controller 48 on EPU 34 reports when the door has been shut.

Figure 6:
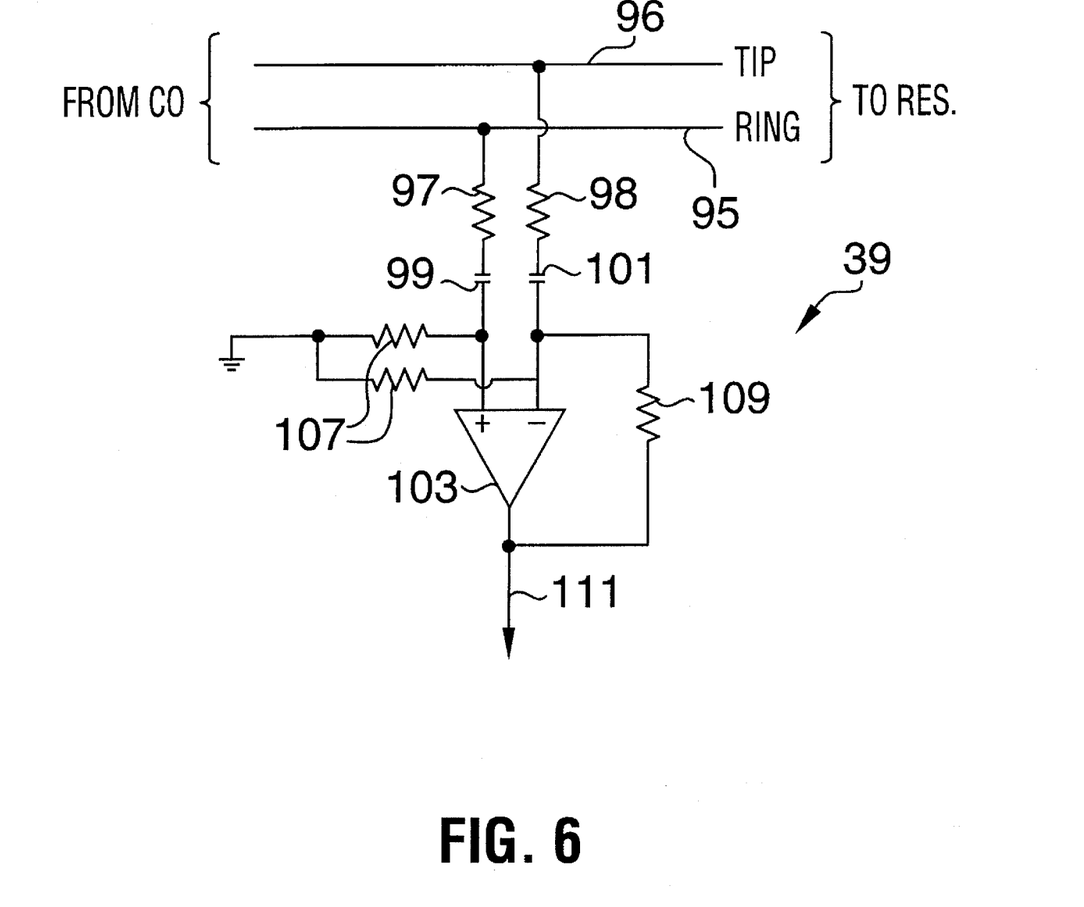
FIG. 6 is a schematic diagram of the voice data detection and discrimination circuit.

Referring to FIG. 6, the AC signal detector or high Z interface 39 is a high input impedance differential amplifier circuit used to detect AC signals across the Tip and Ring lines 96 and 95, respectively. The circuit 39 consists of a differential input operational amplifier 103 which has its positive input coupled to ring line 95 through capacitor 99 and resistor 97 and its negative input to tip line 96 through capacitor 101 and resistor 98. Resistors 97 and 98 are large so that the input to the operational amplifier has a high impedance. A feedback resistor 109 is connected from the negative input to the output of the amplifier 103. The inputs to the operational amplifier 103 are grounded through resistors 107. Operationally any differential AC signals across the tip and ring lines is detected by high Z interface circuit 39 without loading down these lines. Such signals would be present if there were voice or data transmission.

Figure 7:
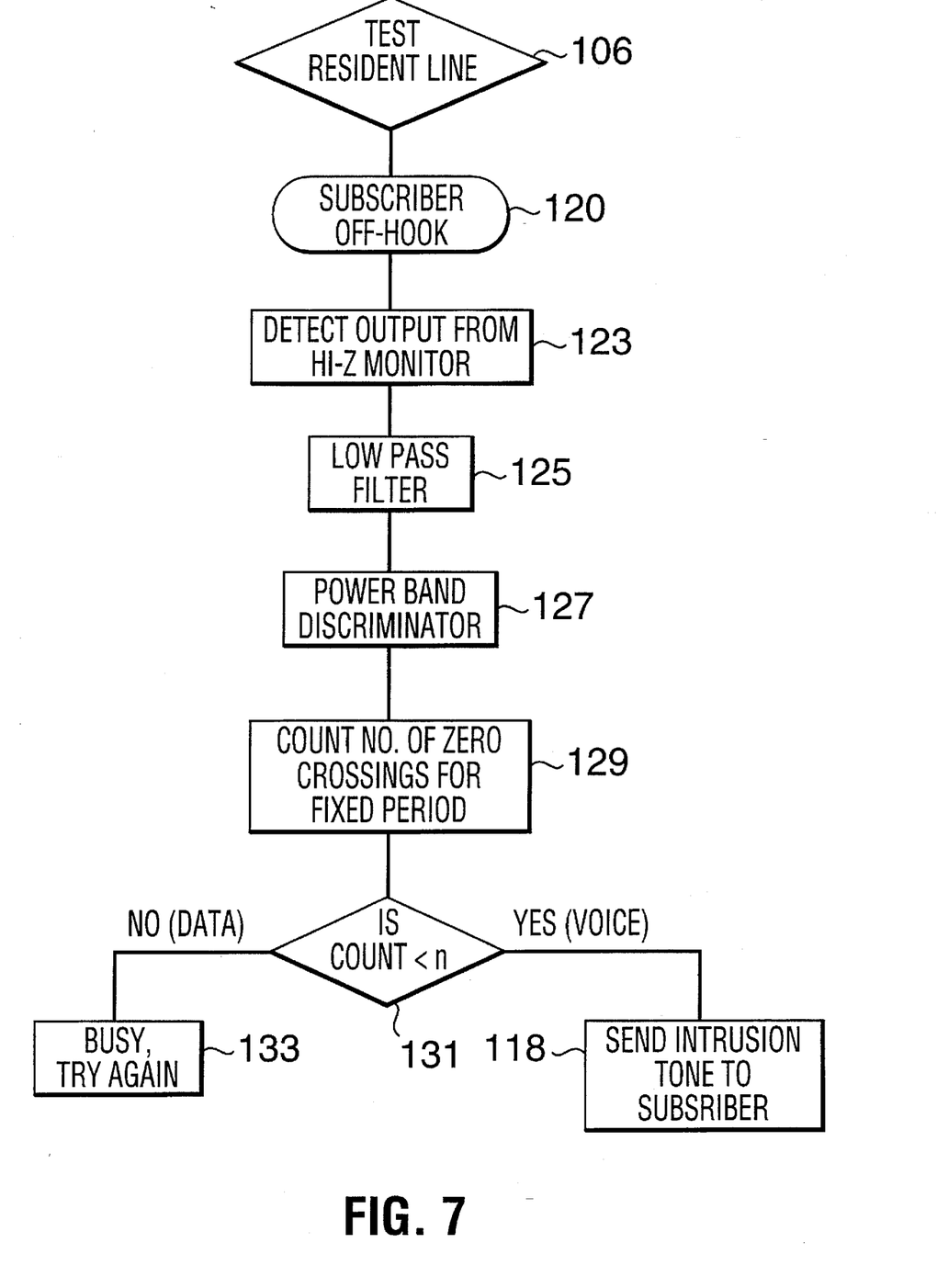
FIG. 7 is a flow sheet of the operation of the voice/data detection and discrimination circuit.

The output 111 of the high Z interface 39 is directed into an analog-to-digital converter whose output is input to the digital signal processor which, in combination, is depicted as DSP 73. The discrimination algorithm running on the DSP 73 is based on a "zero cross count" within a defined time period. The algorithm as shown in FIG. 7 is initiated by a subscriber OFF-HOOK indication 120 following a test of the resident line 106 and takes advantage of the fact that data ordinarily has much shorter time periods than voice. Consequently, the time between "zero crossings" for data will on average be much shorter than for voice. Before detecting zero crossings, however, high frequency noise is filtered by low pass filter 125 and low power signals eliminated by power band discriminator 127. The number of zero crossings for a fixed period is then measured at operation 129. If the result is greater or equal to a predetermined number "n" then data is present and the algorithm goes to operation 133 where a busy signal is provided to the visitor so that the facsimile or data transmission is not interrupted. If the count is less than "n" then an intrusion tone is sent to the subscriber at operation 118.

Figure 8:
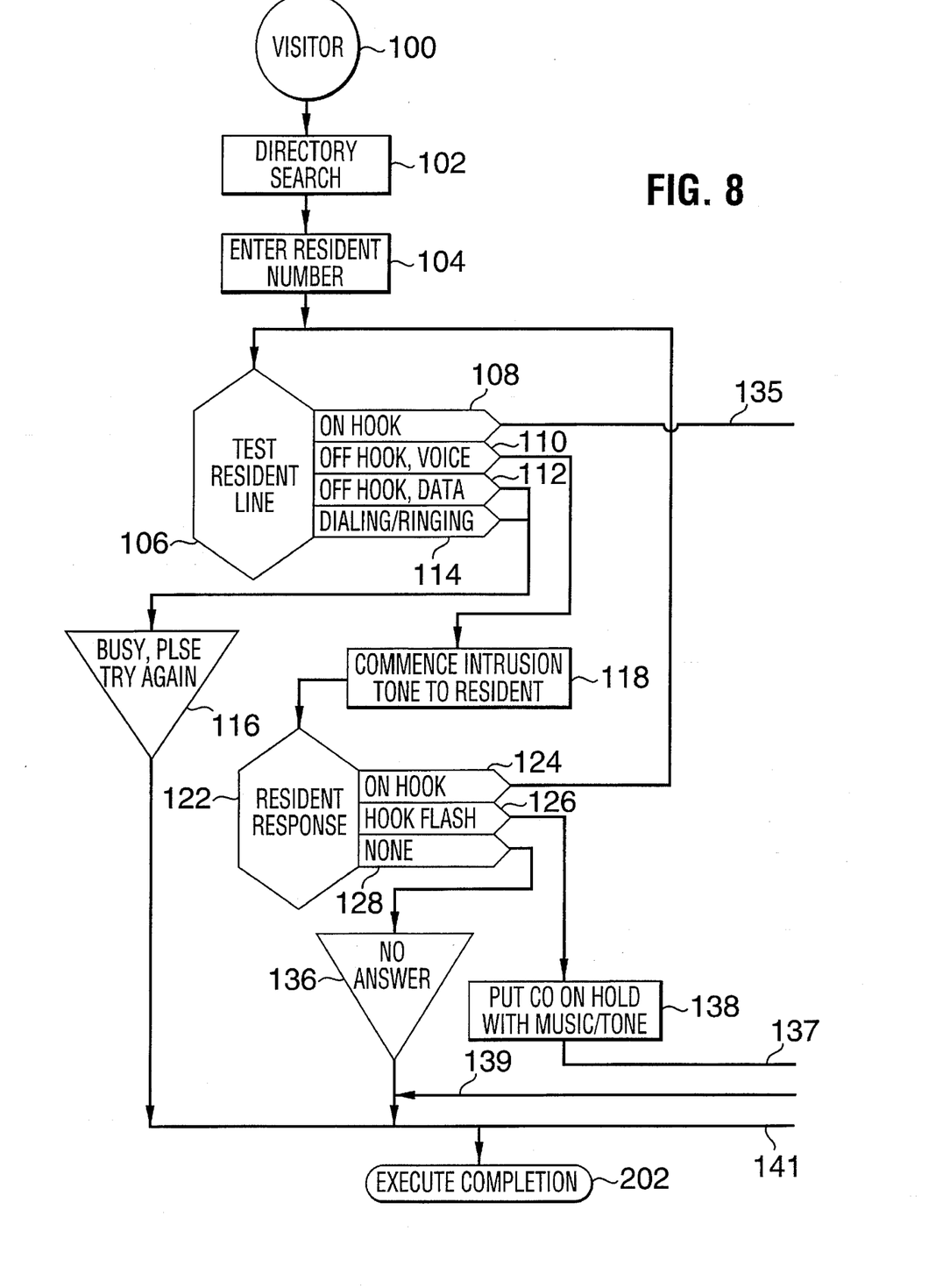
FIG. 8 is a portion of flow sheet of the operation of the system.
Figure 9:
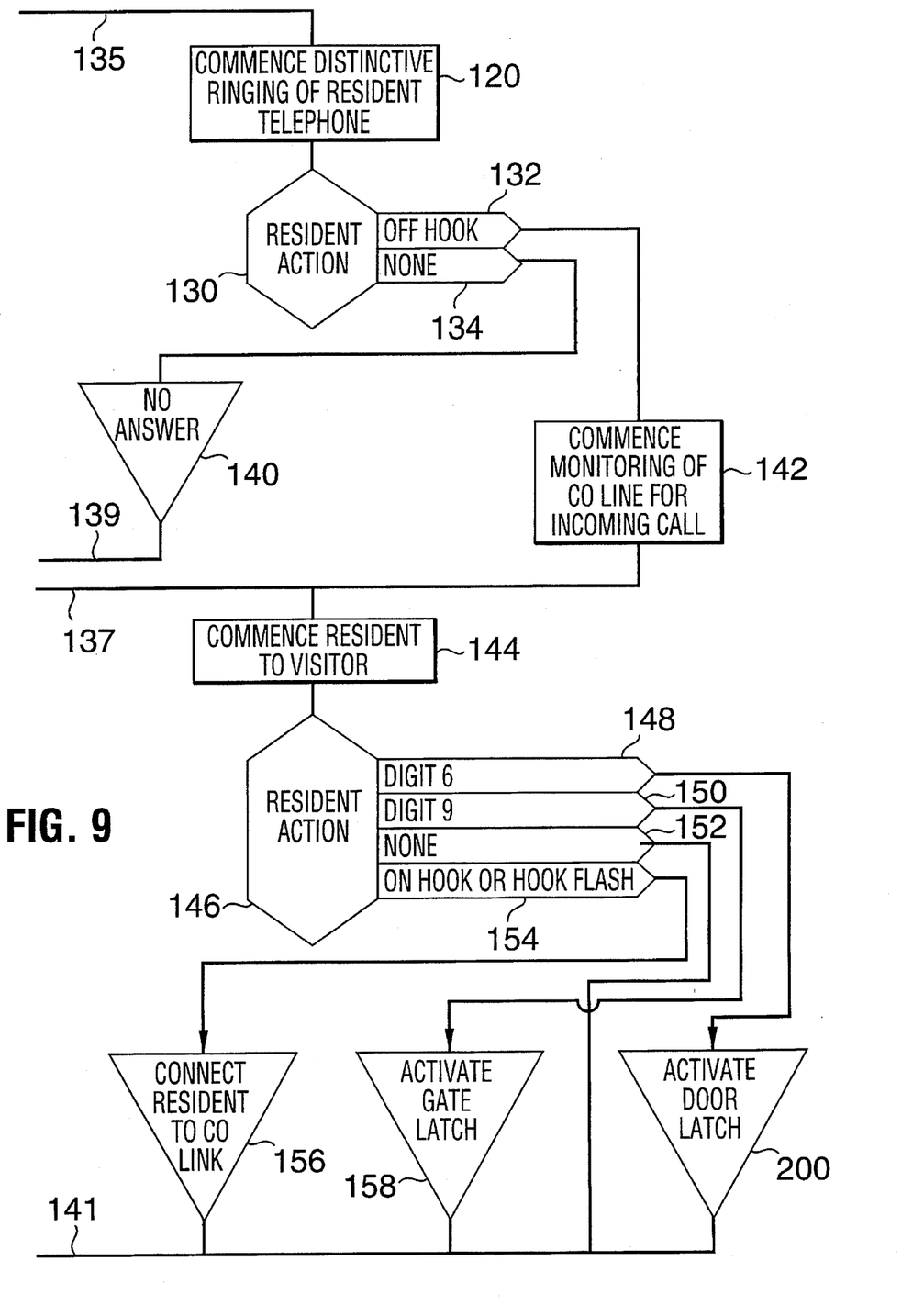
FIG. 9 is another portion of the flow sheet of the operation of the system.

Referring to FIGS. 8 and 9 a visitor 100 entering into keypad 86 appropriate search commands proceeds to operation 102 and initiates a directory search of resident data base 85 and displays the results on electronic display 60. The visitor then enters the resident number at operation 104. The latter entry is tested at operation 106 and if the resident's telephone is ringing already or someone is dialing from it as at operation 114 or if it is off hook with data as at operation 112 then the system indicates the resident's line as busy at 116 and the system operation executes completion at operation 202. If the resident's telephone is off-hook with voice as at operation 110, then the system provides an intrusion tone to the resident at operation 118 and awaits a resident response. If the resident's telephone is on-hook as at operation 108, then distinctive ringing is commenced at operation 120.

Following the intrusion tone, the system looks for a resident response at operation 122. If the resident's telephone goes on-hook, then the system goes back to operation 106 and tests the resident's line which will normally be on-hook and go from operation 108 to operation 120 where the resident's line will commence distinctive ringing. If there is a hook flash as at operation 126 then the system will put the central office caller on hold with music or tone as at operation 138 and connect the resident to the visitor as at 144. If there is no answer as at 128, then the system will go to operation 136 and proceed to execute completion at 202.

Following ringing of the resident's telephone at 120 the system monitors the resident's response as at 130. If there is none as at 134 then the system proceeds to operation 140 where it will be directed to the execute completion at operation 202. If the resident's telephone goes off-hook as at 132 then the central office line is set to monitoring for incoming calls at operation 142 and then connects the resident to the visitor at operation 144.

Once the visitor and resident are connected the resident's action is monitored at operation 146. If the resident presses the digit "6" at operation 148 then the door latch is activated at operation 200, completing execution. If the resident presses the digit "9" then the gate latch is activated at operation 158. If there is a hook flash or the resident's phone goes on hook, then the resident is connected to the central office link at operation 156 completing the operations by proceeding to execute completion at operation 202.

Figure 10:
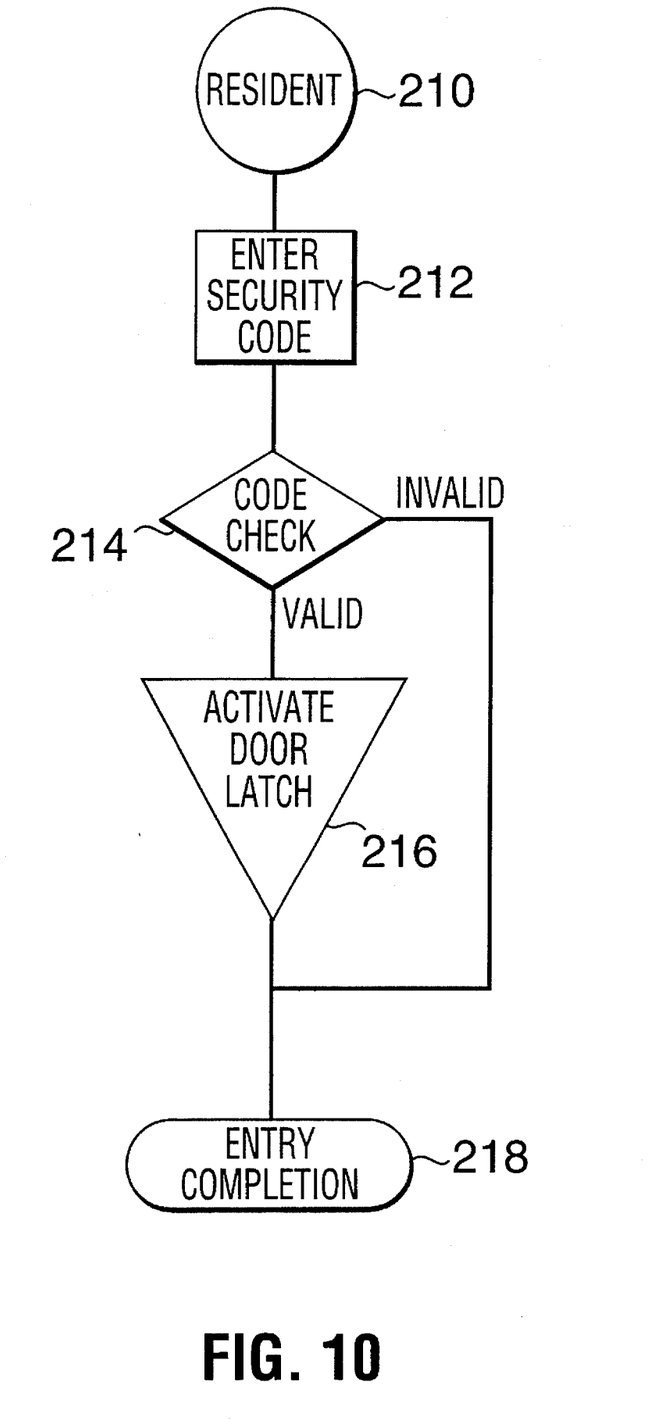
FIG. 10 is a flow sheet of the operation of the security entry code system.

Referring to FIG. 10, the security code entry system operation occurs by the resident at operation 210 entering his or her security code entry number at operation 212. This entered code is checked at operation 214 and if found valid results in the door latch being activated at operation 216. If found invalid then the system goes directly to entry completion at operation 218.

All cards in the system are intelligent and communicate on a peer to peer basis using established protocol. Multiple simultaneous calls are possible with some blocking constraints but these constraints are reported on the displays of EPU's 34 or 35. A production test program is programmed into each neuron chip on each card which allows each card to be tested. This facility is possible only because each card has its own intelligence, i.e., its own neuron chip. Since DIU 32 can deal with two EPU's at a time, in order to have multiple EPU's functioning simultaneously, there must be half as many DIU's as there are functioning EPU's. Because LIU 29 can deal only with one visitor at a time, in order to be able to deal with more than one visitor at a time, it is necessary to have as many LIU's as the number of such visitor communications as is desired.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

We claim:

1. An integrated building control system, comprising:
   (a) a digital voice data bus for conducting digital, time-multiplexed, multi-channel voice/data information and a local operating network (LON) bus for conducting communication and control processor protocol signals;
   (b) a Central Office-Resident (CO-RES) bus having sets of tip and ring lines for conducting analog voice and data signals;
   (c) a line card unit having line card communication and control processor, said line card unit coupled to said CO-RES bus, to a set of central office lines and to a corresponding set of resident telephone lines, and operative to activate switches so as to couple selected ones of said central office lines and said resident telephone lines to said CO-RES bus;
   (d) a line interface unit having a line interface communication and control processor, said line interface unit coupled to said CO-RES Bus and to said digital voice/data bus, and operative to interface between lines of said CO-RES Bus and said digital voice/data bus and to provide digital signal processing of voice and data on said digital voice/data bus under the control of said line interface communication and control processor means;
   (e) a digital interface unit coupled to said digital voice/data bus and a Digital Interface Unit (DIU) communication and control processor operative to control the receiving, routing and transmission of digital voice and data signals to and from said digital voice/data bus and to said entrance panel units;
   (f) an entrance panel unit coupled to said digital interface unit and operative to receive from and transmit to said digital interface unit digital voice and data signals, said entrance panel unit having a relay coupled to an entrance door and operative to unlock said door in response to activation of said relay, a resident data base to store information concerning residents, a digital signal processor for digitizing and compressing analog voice and data signals, means for displaying output information, an entrance panel communication and control processor coupled to said relay, said displaying means, and said digital signal processor and operative to control the operation of each; and
   wherein said communication and control processors on said line card unit, said line interface unit, said digital interface unit and said entrance panel are coupled to said LON bus, monitor the operation of components on respective ones of said line card unit, said line interface unit, said digital interface unit and said entrance panel unit and engage in distributed, peer-to-peer communications and control.

2. A system according to claim 1, including a high impedance monitor circuit coupled to said CO-RES bus for discriminating between the presence of voice signals and the presence of data signals on said CO-RES bus.

3. A system according to claim 2, wherein said high impedance monitor circuit includes a differential amplifier whose positive and negative inputs are coupled through high impedance resistors to each of the tip and ring lines of said CO-RES bus.

4. A system according to claim 2, including means for sensing AC signals across tip and ring lines of said CORES bus and for determining whether or not such signals are due to voice or data.

5. A system according to claim 1, wherein said line interface unit has a CODEC for digitizing and compressing analog data prior to placing such data onto the digital voice/data bus and including a 2–4 wire interface coupled to said CO-RES bus and an analog switch coupled between the 2–4 wire interface and the CODEC for controlling the transmission of analog signals to the CODEC.

6. A system according to claim 1, wherein a communication and control processor is located on each of said line card unit, said line interface unit, said digital interface unit, and said entrance panel unit.

7. A system according to claim 1, including a serial adapter coupled to digital communication lines linking said entrance panel unit and said digital interface unit operative to couple to a computer so that application codes of a stored software program in said system may be changed so as to, in turn, change the function of the system.

8. A system according to claim 1, wherein said line interface unit includes a 2–4 wire interface coupled to said CO-RES Bus, an analog switch coupled to said 2–4 wire interface and a CODEC coupled to said analog switch, said CODEC operative to digitize and compress analog data before placing it on said digital voice/data bus and to receive digitized, compressed data from said digital voice/data bus and to transmit it through said switch and 2–4 wire interface onto said CO-RES bus.

9. An integrated building control system, comprising:
   (a) a digital, time-multiplexed, multi-channel voice/data bus for conducting voice and data;
   (b) a local operating network (LON) bus for conducting communication and control processor protocol signals;
   (c) a Central Office Resident (CO-RES) bus having sets of tip and ring lines for conducting analog voice and data signals;
   (d) a plurality of line card units each having a line card communication and control processor, said line card units coupled to said CO-RES bus, to a set of central office lines and to a corresponding set of resident telephone lines, and operative to activate switches so as to couple selected ones of said central office lanes and said resident telephone lines to said CO-RES bus;

(e) a line interface unit having a line interface communication and control processor, said line interface unit coupled to said CO-RES Bus and to said digital voice/data bus, and operative to interface between lines of said CO-RES Bus and said digital voice/data bus;

(f) a digital interface unit having a digital interface communication and control processor, said digital interface unit coupled to said digital voice/data bus and operative to receive, route and transmit digital voice and data signals to and from said digital voice/data bus; and (g) an entrance panel unit coupled to said digital interface unit and operative to receive from and transmit to said digital interface unit digital voice and data signals, said entrance panel unit having a relay coupled to unlock in entrance door in response to activation of said relay, a resident data base to store information concerning residents, a digital signal processor for digitizing and compressing analog voice and data signals, means for displaying output information, an entrance panel communication and control processor coupled to each of said relay, said displaying means and said digital signal processor and operative to control the operation of each;

wherein said communication and control processors on said line card unit, said line interface unit, said digital interface unit and said entrance panel unit are coupled to said LON bus and monitor fie operation of components on respective ones of said line card unit, said line interface unit, said digital interface unit, and said entrance panel unit and engage in distributed, peer-to-peer communications and control.

10. An integrated building control system, comprising:

(a) a digital, time multiplexed, multi-channel voice/data bus for conducting voice and data signals;

(b) a local operating network (LON) bus for conducting communication and control processor protocol signals;

(c) a Central Office Resident (CO-RES) bus having sets of tip and ring lines;

(d) a line card unit having a set of relays with one relay between each one of a plurality of subscriber lines and each one of a plurality of central office lines, and a line card communication and control processor coupled to said set of relays and operative to connect said CO-RES bus to one of said central office lines or monitor one of said resident lines and coupled to said local operating network bus;

(e) a line interface unit having a line interface communication and control processor coupled to said local operating network bus, and a CODEC for digitizing and compressing analog data prior to placing such data onto said digital voice/data bus, a 2–4 wire interface coupled to said CO-RES bus and an analog switch coupled between said 2–4 wire interface and said CODEC for controlling the transmission of analog signals to said CODEC;

(f) an entrance panel unit having a keypad for permitting a visitor to enter information, a door lock control, a speaker and microphone for transmitting and receiving, respectively, analog audio signals, a digital signal processor for digitizing and compressing analog audio signals, a digital subscriber interface circuit for interfacing with said digital signal processor, and an entrance panel communication and control processor coupled to said keypad, said door lock control and said digital subscriber interface circuit and said digital signal processor for controlling and monitoring the operation of each of said keypad, said door lock control, said speaker and microphone, said digital subscriber interface circuit, and said digital signal processor; and (g) a digital interface unit having a digital interface communication and control processor coupled to said local operating network bus and to the entrance panel communication and control processor, a digital switch coupled to said digital interface communication control processor and said digital voice/data bus anti a digital subscriber interface circuit coupled to said digital switch and to the digital subscriber interface circuit of said entrance panel unit;

wherein said communication and control processors are coupled to said local operating network bus and engage in distributed, peer-to-peer communications.

11. A system according to claim 10, wherein each of said line card unit, said line interface unit, said digital interface unit, and said line interface unit have a plurality of circuit elements thereon and said communication and control processors on said line card unit, said line interface unit, said digital interface unit and said entrance panel unit is coupled to each of said circuit elements on respective ones of said line card unit, said line interface unit, said digital interface unit and said entrance panel unit.

12. A system according to claim 10, including means for detecting and discriminating between voice and data on said tip and ring lines of said CO-RES bus.

13. A system according to claim 10, wherein each digital interface unit can communicate concurrently with two entrance panel units.

14. A system according to claim 10, wherein said local operating network bus, said voice/data bus, a power distribution line, and said CO-RES bus are located on a backplane common and accessible to all of said units.

15. A system according to claim 10, wherein said system provides personal entry code access.

16. A system according to claim 10, including a card access system and wherein said entrance panel unit includes a card access system interface.

17. A system according to claim 10, wherein said entrance panel includes an interface to an infra red remote control access unit whereby interception of a preset coded infra red signal results in said system unlatching a door.

* * * * *